United States Patent [19]

Grinaski

[11] Patent Number: 5,203,432
[45] Date of Patent: Apr. 20, 1993

[54] FLAT LINEAR MOTOR DRIVEN ELEVATOR

[75] Inventor: Timothy J. Grinaski, East Hartford, Conn.

[73] Assignee: Otis Elevator Company, Farmington, Conn.

[21] Appl. No.: 793,056

[22] Filed: Nov. 15, 1991

[51] Int. Cl.[5] .............................................. B66B 17/12
[52] U.S. Cl. ...................................... 187/94; 187/112; 310/12
[58] Field of Search ..................... 187/18, 17, 94, 112; 310/12, 13, 14

[56] References Cited

U.S. PATENT DOCUMENTS 5,033,588 7/1991 Nakai et al. ............................ 187/17
5,086,881 2/1992 Gagnon et al. ....................... 187/17

Primary Examiner—Robert P. Olszewski
Assistant Examiner—Kenneth Noland
Attorney, Agent, or Firm—Lloyd D. Doigan

[57] ABSTRACT

A flat, single-sided linear motor driven elevator minimizes a moment on a primary element assembly towards a secondary element by aligning and balancing a center of gravity of the primary element assembly along the plane of an air gap between the primary and secondary elements of the linear motor. Ropes supporting the primary element assembly are attached thereto, and weights are positioned on a side of the plane, other than the side of the plane on which the primary element is disposed, to balance the centers of gravity and thrust of the primary assembly along the plane.

3 Claims, 3 Drawing Sheets

FLAT LINEAR MOTOR DRIVEN ELEVATOR

TECHNICAL FIELD

This invention relates to an elevator, and more particularly to an elevator driven by a flat linear motor.

BACKGROUND OF THE INVENTION

Usually, an elevator's drive sheave and motor are arranged above the elevator car in a machine room. In buildings, where space is at a premium, machine rooms are not desirable. Some elevators are powered by linear motors, which provide motive force for the elevator within a hoistway, and do not require a machine room.

Some linear motor driven elevators have a tubular primary element disposed around a tubular secondary element. The tubular secondary element is hung from the top of the hoistway. At present, it is impractical to hang a secondary element over an extended rise.

UK Patent Application 2,237,555 A to Toshiba shows another type of linear motor driven elevator which has a flat secondary and a flat primary element. The secondary element is affixed to the hoistway thereby avoiding the problem of hanging the secondary element from the top of the hoistway. The primary assembly of Toshiba is guided by the secondary thereby avoiding the necessity of mounting additional guide rails for the primary assembly.

Flat linear elevator motors balance the relatively large normal forces (as compared to thrust forces) between the primary and secondary elements to maintain an air gap therebetween. If the air gap is too great the motor is inefficient. If the air gap is too small, the motor may short itself out.

DISCLOSURE OF THE INVENTION

It is an object of the invention to provide an elevator linear motor which minimizes the effect of forces between the primary element and secondary element of the linear motor.

It is a further object of the invention to minimize the forces upon guides disposed between the primary and secondary elements of the linear motor.

It is a further object of the invention to provide a linear motor which has an air gap that can be more readily controlled.

According to the invention, a flat, single-sided linear motor driven elevator minimizes a moment of a primary element assembly towards the secondary element by aligning and balancing the coincident centers of gravity and thrust of the primary element assembly along a plane of an air gap between the primary and secondary elements of the linear motor. Ropes supporting the primary element assembly are attached thereto, and weights are positioned on a side of the plane, other than the side of the plane on which the primary element is disposed, to balance the center of gravity of the primary assembly along the plane.

By aligning the primary element assembly along the plane, guides disposed between the primary and secondary elements are protected against excessive wear because the forces of any moment due to misalignment with the plane are minimized. Also, the air gap may be more closely controlled because the effect of moments on the primary assembly are minimized.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
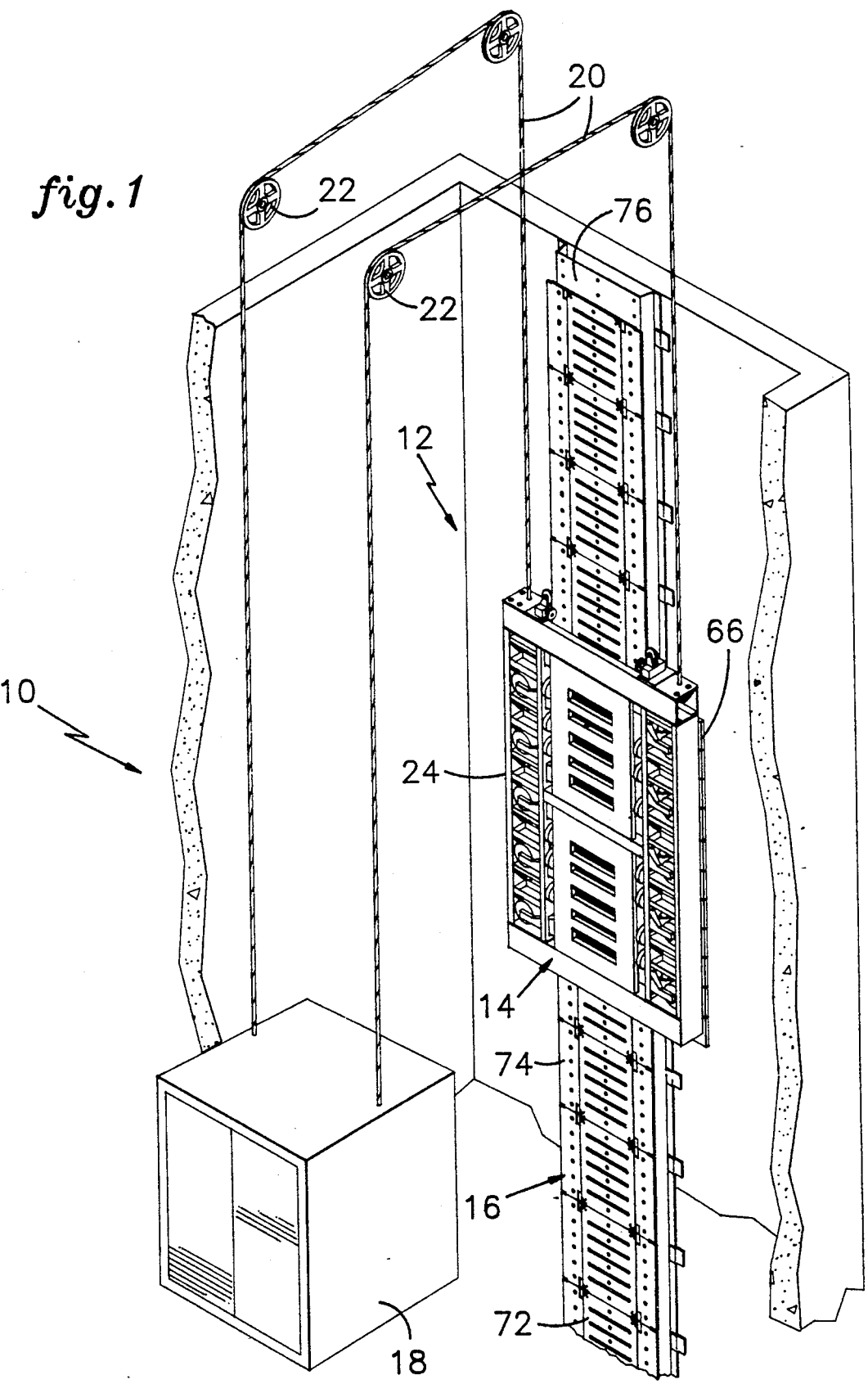
FIG. 1 is a perspective view, partially broken away, of an elevator driven by a flat linear motor of the invention.

Referring to FIG. 1, an embodiment of an elevator 10 employing a flat linear motor 12 is shown. The motor comprises a primary assembly 14 and a secondary assembly 16. The primary assembly attaches to an elevator car 18 by means of ropes 20 and pulleys 22. Only two ropes are shown for ease of illustration. However, one of ordinary skill in the art will recognize that safety codes require more ropes to support the primary assembly.

The Primary Assembly

Figure 2:
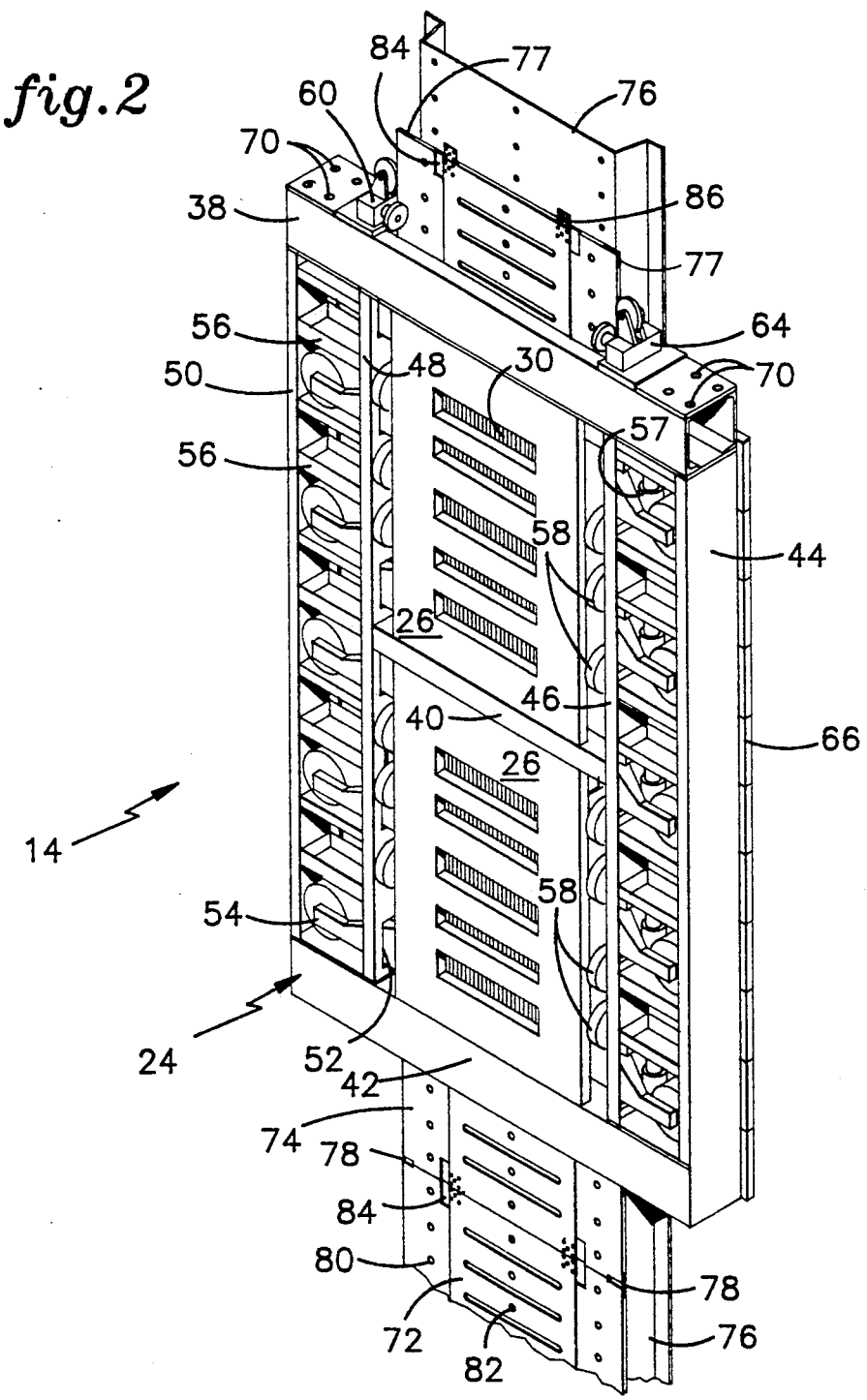
FIG. 2 is an expanded view, in perspective and partially broken away, of the flat linear motor of FIG. 1.
Figure 3:
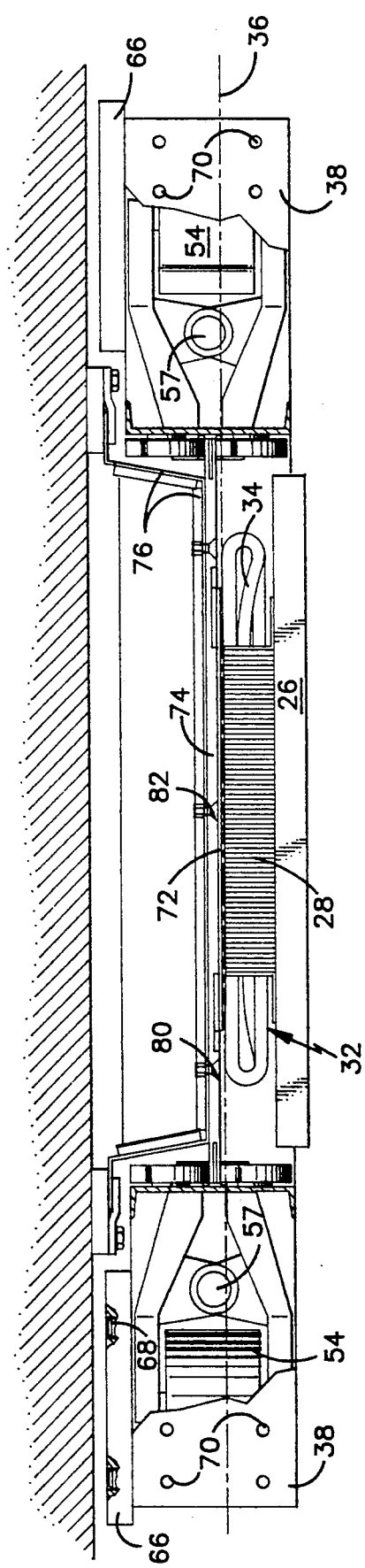
FIG. 3 is a top view, partially broken away and partially in section, of the flat linear motor of FIG. 2.

Referring to FIGS. 2 and 3, the primary assembly 14 comprises a rectangular frame 24 attached to the ropes 20, a pair of backing plates 26 attaching to the frame, and a pair of primary elements 28 each affixed to a backing plate.

As known in the art, each primary element 26 has a magnetic flux-carrying core comprising a plurality of vertically extending, steel laminations 30. A plurality of current carrying coils 32, one set for each phase of excitation and one or more sets per magnetic pole, are situated within slots (not shown) in the laminations as is known in the art. Interconnections 34 are made between coils as is common in the art of motor construction.

The backing plates 26 strengthen and stiffen the primary elements against deflection due to magnetic and other dynamic loads. Deflection of the primary elements 28 must be minimized to maintain an air gap (disposed along a plane evidenced by line 36) between the primary element and the secondary element thereby minimizing the potential for interference therebetween. The backing plates 26 transmit thrust forces developed in the air gap between the primary elements 28 and the secondary assembly 16 to the frame 24. As a result, the frame (and the car 18 via ropes 20) may be driven upwardly and downwardly by operation of the motor 12.

The frame 24, which is constructed of structural steel, or the like, has an upper cross-piece 38, a central cross-piece 40, and a lower cross-piece 42. The upper and lower cross-pieces are connected by a first outer support 44, a first inner support 46, a second outer support 48, and a second inner support 50. The central cross-piece 40 connects the first and second inner supports 46, 48 at a medial portion thereof. A backing plate 26 is attached to the central cross-piece 40 and the lower cross-piece 42. Another backing plate 26 is attached to the central cross-piece 40 and the upper cross-piece 38. Thrust forces generated in the air gap between the primary and secondary assemblies are transmitted via the cross-pieces and the supports to the ropes.

Each inner support 46, 48 has a plurality of openings 52 through which a conventional brake mechanism 54 extends. A plurality of braces 56 are conventionally attached between each inner and outer support and between adjacent brake mechanisms. Each brake mechanism is attached via a pivot pin 57 (see FIG. 3) to a brace 56 by conventional means.

Each inner support 46, 48 has a plurality of guide rollers 58 mounted thereto. The rollers maintain the air gap in plane 36 as will be discussed infra.

A pair of guide assemblies 60, which face each other, are attached, by conventional means, on each of the upper and lower cross-pieces (not shown). Each guide assembly is comprised of three rollers 62, and a conventional mounting 64 therefor, as is known in the art. The rollers guide the primary assembly 14 along the secondary assembly 16.

A plurality of plates 66 are conventionally attached, by bolts 68 or the like, between the inner and outer supports 44, 46 and 48, 50 to insure that the primary assembly center of gravity and thrust, through weight balancing the primary assembly, is coincident with the plane 36. By weight balancing the primary assembly, the probability that any forces act upon the guide rollers other than the normal forces generated between the primary and secondary elements is minimized. The plates 66 also provide weight necessary to counter the weight of the elevator car 18.

The upper cross-piece 38 has a plurality of openings 70 for conventionally attaching ropes thereto. The openings are distributed about (or in) the plane 36 coincident with the primary assembly center of gravity to insure that the weight balanced primary assembly hangs in the hoistway without bringing moments to bear against the guide rollers.

The Secondary Assembly

The secondary assembly 16 is comprised of a secondary element 72, a secondary 74, and a plurality of brackets 76. The element 72 and the secondary 74 are segmented into manageable size and weight for ease of installation. The secondary and the brackets provide, enough cross-sectional width to accommodate the magnitude of magnetic flux generated by the primary elements 28. The secondary element 72 comprises a plurality of rectangular, thin sheets of a conductive, non-magnetic, material such as aluminum, copper, or an alloy thereof, although copper is preferred.

Each segment of the secondary 74 is constructed of structural steel or the like, and has: a pair of slots 77 on each top edge and each bottom edge; a key 78 disposed in a slot for adjacent pieces of the secondary to align each segment of the secondary; a plurality of openings 80 for bolting or screwing each secondary piece to the brackets 76; a plurality of central openings 82 for attaching the secondary element 72 to the secondary and the brackets; and, four rectangular indentations 84 facing the primary assembly.

The indentations 84 receive a close-fitting rectangular bus bar 86 for carrying current across joints between adjacent segments of the secondary assembly. One pair of indentations 84 communicates with an upper edge of each secondary piece and one pair communicates with a lower edge of the secondary 74 (See FIG. 2). Each indentation extends beyond a width of the secondary element 72 to allow each bus bar to be inserted in the indentation behind adjacent sheets of the secondary element 72.

Each bus bar 86, which comprises a non-magnetic, conductive material, such as aluminum or copper, is attached to the secondary element by means of screws or the like. The screws, which may be countersunk or machined to be flush with the surface of the bus bar, ensure that the bus bar and the secondary are attached with the proper degree of pressure so that the proper degree of conductivity therebetween is maintained.

The brakes 54 and the guide assemblies 60 act upon the secondary 74, thereby obviating the need for guide rails.

Although, the invention has been shown and described with respect to a best mode embodiment thereof, it should be understood by those of ordinary skill in the art, that various omission, changes and additions in the form and detail thereof may be made without departing from the spirit and scope of the invention. One of ordinary skill in the art will recognize from the teachings herein, that the invention will be equally applicable to an elevator motor in which the secondary element moves and the primary element is stationary.

We claim:

1. A flat, single-sided linear motor for driving an elevator, said motor having a single air gap defining a plane between a flat primary element and a flat secondary element, one of said primary or said secondary element being hung by a plurality of ropes, wherein said motor is further characterized by:
   means for coinciding centers of thrust and gravity of said one of said primary or secondary elements in said plane of said air gap to minimize any moments about said plane, and
   said ropes being distributed in or about said plane of said air gap to minimize any moments of said one of said primary or secondary elements about said plane.

2. The linear motor of claim 1, wherein said means for coinciding comprises:
   weights,
   a frame for supporting said one of said primary or secondary elements on a first side of said plane and for supporting said weights on a second side of said plane.

3. A flat, single-sided linear motor for driving an elevator, said motor having an air gap defining a plane between a flat primary element and a flat secondary element, one of said primary or said secondary elements being suspended by a plurality of ropes, wherein said motor is further characterized by:
   weights,
   a frame for supporting said one of said primary or secondary elements on a first side of said plane and for supporting said weights on a second side of said plane, said weights and frame being arranged to coincide centers of thrust and gravity of said one of said primary or secondary elements in said plane to minimize any moments about said plane, and
   said ropes being distributed in or about said plane to minimize any moments of said one of said primary or secondary elements about said plane.

* * * * *